(12) United States Patent
Kondo et al.

(10) Patent No.: US 7,361,393 B2
(45) Date of Patent: Apr. 22, 2008

(54) OPTICAL DISK HAVING A HARD COAT LAYER HAVING LUBRICITY IMPARTED

(75) Inventors: Satoshi Kondo, Yokohama (JP); Toshihiko Higuchi, Yokohama (JP); Hirotsugu Yamamoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 238 days.

(21) Appl. No.: 11/130,262

(22) Filed: May 17, 2005

(65) Prior Publication Data

US 2005/0237917 A1    Oct. 27, 2005

Related U.S. Application Data

(63) Continuation of application No. PCT/JP03/14525, filed on Nov. 14, 2003.

(30) Foreign Application Priority Data

Nov. 18, 2002   (JP)   ............................. 2002-333366

(51) Int. Cl.
*B32B 3/02*   (2006.01)
(52) U.S. Cl. ................ 428/64.1; 428/64.4; 430/270.11
(58) Field of Classification Search ............... 428/64.1; 430/270.1, 270.11
See application file for complete search history.

(56) References Cited

U.S. PATENT DOCUMENTS 5,449,702 A * 9/1995 Tayama et al. ............... 522/4
5,498,657 A * 3/1996 Sugiyama et al. .......... 524/463
5,585,201 A   12/1996 Ha
6,833,393 B2  12/2004 Ishizeki et al.
6,921,576 B2 * 7/2005 Terauchi et al. ............ 428/404
7,026,030 B2 * 4/2006 Itoh et al. ................. 428/64.1

(Continued)

FOREIGN PATENT DOCUMENTS

CN    1053804 A    8/1991

(Continued)

OTHER PUBLICATIONS

U.S. Appl. No. 11/128,384, filed May 13, 2005, Kondo et al.

(Continued)

*Primary Examiner*—Elizabeth Mulvaney
(74) *Attorney, Agent, or Firm*—Oblon, Spivak, McClelland, Maier & Neustadt, P.C.

(57) ABSTRACT

An optical disk of a system wherein a recording layer is to be irradiated with a laser beam through a thin film cover layer, wherein on the surface of the thin film cover layer, a hard coat layer is formed which is made of a cured product of an active energy ray curable composition comprising a polymerizable monomer (A), a colloidal silica (B), a lubricity-imparting agent (C) and an active energy ray polymerization initiator (D), as components. The lubricity-imparting agent (C) contains a lubricity-imparting agent (C-T) having, in one molecule, a moiety (c-1) exerting lubricity, a moiety (c-2) excellent in compatibility with the polymerizable monomer and an active energy ray curable functional group (c-3). In the optical disk of the present invention, the hard coat layer formed on the surface of the thin film cover layer is excellent in abrasion resistance, transparency and long-term surface lubricity.

14 Claims, 1 Drawing Sheet

U.S. PATENT DOCUMENTS

| | | | |
|---|---|---|---|
| 7,132,146 B2 * | 11/2006 | Itoh et al. | 428/64.1 |
| 7,132,460 B2 * | 11/2006 | Fujimoto et al. | 522/14 |
| 7,153,558 B2 * | 12/2006 | Hayashida et al. | 428/64.4 |
| 7,173,778 B2 * | 2/2007 | Jing et al. | 359/810 |

FOREIGN PATENT DOCUMENTS

| | | |
|---|---|---|
| CN | 1173943 A | 2/1998 |
| JP | 2-64138 | 3/1990 |
| JP | 4-256435 | 9/1992 |
| JP | 5-117545 | 5/1993 |
| JP | 5-239122 | 9/1993 |
| JP | 10-81839 | 3/1998 |
| JP | 2001-335624 | 12/2001 |
| JP | 2001-344816 | 12/2001 |
| JP | 2002-92957 | 3/2002 |
| JP | 2002-245672 | 8/2002 |
| JP | 2003-196883 | 7/2003 |
| WO | WO 02/059890 | 8/2002 |

OTHER PUBLICATIONS

U.S. Appl. No. 11/130,262, filed May 17, 2005, Kondo et al.
U.S. Appl. No. 11/131,280, filed May 18, 2005, Kondo et al.

* cited by examiner

OPTICAL DISK HAVING A HARD COAT LAYER HAVING LUBRICITY IMPARTED

BACKGROUND OF THE INVENTION

1. Field of the Invention

The present invention relates to an optical disk of a system wherein a recording layer and a thin film cover layer are laminated on the surface of a substrate in this order, and the recording layer is to be irradiated through the thin film cover layer with a laser beam to be used for recording and/or retrieving data, wherein on the surface of the thin film cover layer, a hard coat layer is further formed which is excellent in abrasion resistance, transparency and long-term surface lubricity.

2. Discussion of Background

In recent years, attention has been drawn to an optical recording device capable of recording a large amount of data quickly in high density and capable of quickly retrieving the recorded information, in response to the progress in multimedia. Such an optical recording device includes one for retrieving information recorded on a read-only disk having data preliminarily stamped on a disk at the time of preparation of the disk to permit only to retrieve the information, such as a compact disk (CD) or a laser disk (LD), one for recording data and retrieving the data recorded on a recordable disk capable of recording only once, such as CD-R, and one for recording data and retrieving the data recorded on a rewritable disk capable of rewriting and erasing data as many times as desired by means of a magnetooptical recording system or a phase change recording system. By these optical recording devices, recording and retrieving of data are carried out by means of a beam spot having a laser beam narrowed down to a diffraction limit by a lens. The size of this beam spot will be about $\lambda$/NA where $\lambda$ is the wavelength of the laser beam, and NA is the numerical aperture of the lens ("Basic and Application of Optical Disk Storage", compiled by Yoshihito Kakuta, Institute of Electronics, Information and Communication Engineers, 1995, p 65).

In order to record information in a higher density i.e. to form a smaller pit pattern on an optical recording medium, it is necessary to make a beam spot smaller. In order to reduce the size of the beam spot, two methods are conceivable from the above formula i.e. a method of shortening the laser beam wavelength ($\lambda$), or a method of increasing the numerical aperture (NA) of the lens. The wavelength of a semiconductor laser for an optical disk which is commonly used at present, is mainly from 780 to 680 nm, but a study is being made to employ an orange color laser having a shorter wavelength of 650 nm, or a green or blue laser beam having a further shorter wavelength.

Particularly, as a system of employing a blue laser, it has been proposed to obtain a higher recording density by adjusting the wavelength of the light source to a level of 400 nm and NA to at least 0.6. However, the allowance for an angle (a tilt angle) of the optical disk plane deviated from the right angle to the optical axis and the allowance for non-uniformity in thickness of the optical disk decrease due to shortening of the wavelength of the light source or increase of NA of the objective lens.

The reason for the decrease of such allowances is such that in the case of the tilt angle of the optical disk, coma aberration occurs, and in the case of the non-uniformity in thickness of the optical disk, spherical aberration occurs, whereby the condensing performance of the optical head device decreases, and read out of a signal tends to be difficult.

In a conventional compact disk (CD) or the like, the thickness of a cover layer which can be formed on the surface of a recording layer is 1.2 mm, and in a digital versatile disk (DVD) or the like, the thickness of such a cover layer is 0.6 mm, whereby the respective disk substrates themselves have played the role of such cover layers, and the recording layer has been irradiated with a laser beam through the disk substrates. However, in the system of employing a blue laser, not only the numerical aperture (NA) of the lens is made large, but also in order to gain the allowance for the above tilt or the allowance for the non-uniformity in thickness of the optical disk even a little, it is necessary to make this cover layer thin to a level of 0.1 mm. Accordingly, it has become impossible to let the substrate itself play the role of the cover layer, like in the conventional optical disk. Therefore, in the blue laser system, it is necessary to form a thin film cover layer with a thickness of about 0.1 mm on the surface having a recording layer (a laminated film comprising a reflective film, a recording film and the like) formed and the laminated film will be irradiated with a laser beam through the thin film cover layer.

When a laser having a short wavelength like a blue laser is used, the distance between the optical head and the optical disk will be small at a level of from 0.1 to 0.2 mm. In an optical recording device, in order to accomplish a high data transfer rate, an optical disk is required to be rotated at an extremely high speed, and depending upon the combination of the wavelength of the laser beam to be used, the numerical aperture (NA) of the lens, the recording capacity of the disk and the desired data transfer rate, the maximum rotational speed of an optical disk may reach a level of at least 2,500 rpm, in some cases at least 5,000 rpm. As an optical disk is rotated at such a high speed in the state where the distance of the optical head and the optical disk is very narrow as mentioned above, it is possible that the optical head will be in contact with the optical disk, and accordingly, the thin film cover layer covering the surface of the recording layer, is required to have a high abrasion resistance.

Further, when a laser having a shorter wavelength is used, scratches formed or dust deposited on a laser beam incident surface of the optical disk is likely to lead to errors at the time of recording or retrieving. Therefore, in order to prevent such errors at the time of recording or retrieving, the thin film cover layer constituting the laser beam incident surface is required to have higher abrasion resistance.

The thin film cover layer preferably has a surface lubricity in addition to the abrasion resistance. Even if the thin film cover layer is excellent in the abrasion resistance, if it is poor in the surface lubricity, the absolute value of the frictional force exerted to the disk will increase, and the fluctuation in the frictional force will also increase, whereby rotation of the disk tends to be unstable, thus leading to recording errors or tracking errors.

The surface lubricity imparted to the thin film cover layer will contribute also to an improvement of the abrasion resistance of the thin film cover layer, because if the surface lubricity is imparted to the surface of the thin film cover layer, an exerted external force will be reduced thereby to improve the abrasion resistance.

An optical disk is disclosed which is an optical disk having a substrate, a recording layer, a protective layer and a hard coat layer laminated in this order, wherein the hard coat layer is a layer of a cured product of a composition comprising an organic covered silica (1) obtained by a condensation reaction of a hydrolysate of fine particles of colloidal silica and an organic silane compound, an ethylenically unsaturated compound (2), a slipping agent (3) and a photopolymerization initiator (4) (JP-A-2002-245672).

However, silicone oil exemplified as the slipping agent (3) has a low affinity with other components of the composition and thus has a problem such that the transparency of the cured product layer tends to be poor, or it is likely to bleed out on the surface of the cured product layer, whereby the surface lubricity can not be maintained over a long period.

On the other hand, a curable composition is known which contains as a radical curable component an unsaturated group-containing siloxane-modified polyester obtained by ring opening polymerization of a lactone such as ε-caprolactone by using as a polymerization initiator a polysiloxane having an active hydrogen-containing functional group and an unsaturated group (JP-A-2001-335624). However, such a composition has had a problem that it is poor in abrasion resistance and transparency.

SUMMARY OF THE INVENTION

It is an object of the present invention to realize high performance of an optical disk of a system (which may hereinafter sometimes referred to simply as an optical disk) wherein a recording layer and a thin film cover layer are laminated on the surface of a disk substrate in this order, and the recording layer is to be irradiated through the thin film cover layer with a laser beam with a short wavelength such as a blue laser to be used for recording and/or retrieving data. Namely, it is an object of the present invention to provide an optical disk wherein a hard coat layer to provide abrasion resistance, transparency and long-term surface lubricity, is formed on the surface of the thin film cover layer of such an optical disk.

The present invention provides an optical disk of a system wherein a recording layer and a thin film cover layer with a thickness of from 5 to 200 μm, are laminated on a substrate in this order, and the recording layer is to be irradiated through the thin film cover layer with a laser beam to be used for recording and/or retrieving data, wherein a hard coat layer (X) is formed on the thin film cover layer, and the hard coat layer (X) is made of a cured product of an active energy ray curable composition (Q) comprising an active energy ray curable polymerizable monomer (A), a colloidal silica (B) having an average particle size of from 1 to 200 nm, a lubricity-imparting agent (C) and an active energy ray polymerization initiator (D), provided that the polymerizable monomer (A) contains at least 20 mass % of a polyfunctional polymerizable monomer (a-1) having at least two polymerizable functional groups selected from the group consisting of an acryloyl group and a methacryloyl group in one molecule, in the total mass of the polymerizable monomer (A) contained in the curable composition (Q), and the lubricity-imparting agent (C) contains a lubricity-imparting agent (C-T) having, in one molecule, a moiety (c-1) made of a portion represented by the following formula (1), at least one moiety (c-2) selected from the group consisting of portions represented by the following formulae (2) to (5), and an active energy ray curable functional group (c-3):

—(SiR$^1$R$^2$O)$_m$—             Formula (1)

wherein each of R$^1$ and R$^2$ is either a C$_{1-8}$ alkyl group or a phenyl group, and m is an integer of from 1 to 1,000,

             Formula (2)

—(CH$_2$CH$_2$O)$_x$—             Formula (3)

—(CH$_2$CH(CH$_3$)O)$_y$—             Formula (4)

—(C(=O)C$_u$H$_{2u}$O)$_t$—             Formula (5)

wherein R$^3$ is a C$_{6-20}$ alkylene group, each of x and y is an integer of from 5 to 100, u is an integer of from 3 to 5, and t is an integer of from 1 to 20.

According to the present invention, it is possible to provide an optical disk of a type wherein a recording layer and a thin film cover layer are laminated on the surface of a substrate in this order, and the recording layer is to be irradiated through the thin film cover layer with a laser beam with a short wavelength represented by a blue laser to be used for recording and/or retrieving data, wherein a hard coat layer which is excellent in abrasion resistance and long-term surface lubricity and which is excellent also in transparency, is formed on the surface of the thin film cover layer.

The active energy ray curable composition (Q) preferably comprises 100 parts by mass of the polymerizable monomer (A), from 5 to 300 parts by mass of the colloidal silica (B), from 0.01 to 10 parts by mass of the lubricity-imparting agent (C), and from 0.01 to 20 parts by mass of the active energy ray polymerization initiator (D).

The colloidal silica (B) is preferably a modified colloidal silica obtained by surface modification with a mercapto group-containing silane compound wherein an organic group having a mercapto group, and a hydrolysable group and/or a hydroxyl group, are bonded to a silicon atom.

The colloidal silica (B) is preferably a modified colloidal silica obtained by surface modification with a (meth)acryloyl group-containing silane compound wherein an organic group having a (meth)acryloyl group, and a hydrolysable group and/or a hydroxyl group, are bonded to a silicon atom.

The hard coat layer (X) preferably has a thickness of from 0.1 to 20 μm.

MEANINGS OF SYMBOLS

Figure 1:
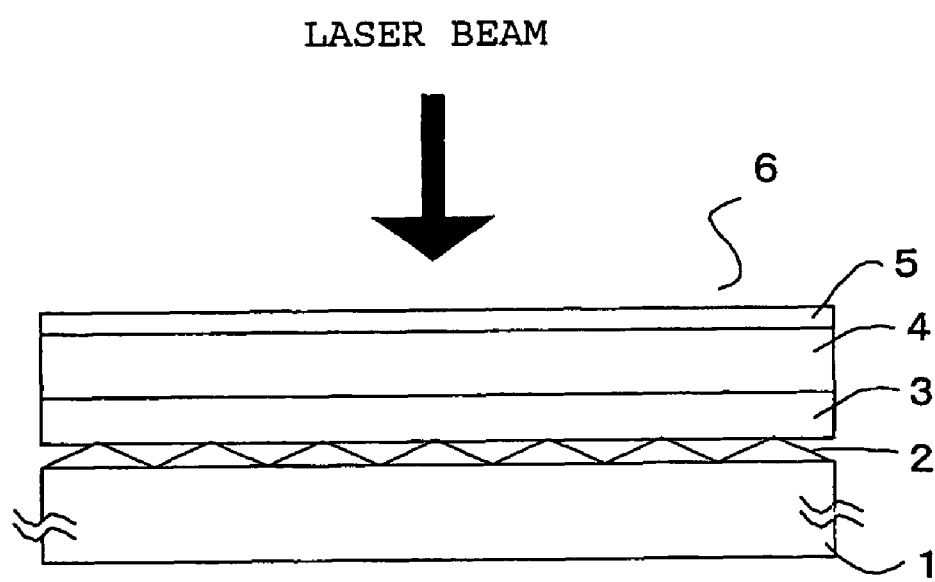
FIG. 1 is a cross-sectional schematic view of an optical disk as an embodiment of the present invention.

1: substrate, 2: guide groove, 3: recording layer, 4: thin film cover layer, 5: hard coat layer (X), 6: optical disk

DETAILED DESCRIPTION OF THE PREFERRED EMBODIMENTS

The optical disk in the present invention is an ultrahigh density recording optical disk which employs a short wavelength laser beam, preferably an orange laser beam with a wavelength of 650 nm, more preferably a green laser beam or a blue laser beam with a shorter wavelength, for recording and/or retrieving data. Namely, it is an optical disk of a type wherein a recording layer is formed on an optical disk substrate, and a thin film cover layer is independently formed on the surface of the recording layer, and a laser beam is to be applied through the thin film cover layer.

In the optical disk of the present invention, on the surface of the thin film cover layer of the optical disk having the above construction, a hard coat layer (X) made of a cured product of the active energy ray curable composition (Q) is further formed.

In the active energy ray curable composition (Q) (hereinafter sometimes referred to as composition (Q)), the active energy ray curable polymerizable monomer (A) (hereinafter sometimes referred to as polymerizable monomer (A)) is a monomer which undergoes polymerization when irradiated with active energy rays in the presence of the active energy ray polymerization initiator (D), as mentioned hereinafter. Specifically, it comprehensively represents a polyfunctional polymerizable monomer (a-1) having at least two acryloyl groups or methacryloyl groups as polymerizable functional groups in one molecule (hereinafter sometimes referred to as monomer (a-1)), and another polymerizable monomer represented by a monofunctional polymerizable monomer (a-2) as mentioned hereinafter. However, it does not include a compound corresponding to the lubricity-imparting agent (C) as mentioned hereinafter. In the following explanation, an acryloyl group and a methacryloyl group will generally be referred to as a (meth)acryloyl group.

In the polymerizable monomer (A), the monomer (a-1) corresponds to the polyfunctional compound (a) disclosed in paragraphs 0013 to 0052 of JP-A-10-81839. Namely, it is a polyfunctional polymerizable monomer having at least two (meth)acryloyl groups in one molecule as polymerizable functional groups capable of being polymerized by active energy rays.

With a view to obtaining high degree abrasion resistance, the monomer (a-1) in the present invention is preferably one having at least three polymerizable functional groups in its molecule, wherein the molecular weight per functional group is at most 120. The following compounds may be mentioned as the monomer (a-1) which satisfies such conditions.

A polyfunctional compound which is a polyester as a reaction product of pentaerythritol or polypentaerythritol and (meth)acrylic acid, and which has at least three, more preferably from 4 to 20, (meth)acryloyl groups. Specifically, trimethylolpropane tri(meth)acrylate, pentaerythritol tri(meth)acrylate, pentaerythritol tetra(meth)acrylate or dipentaerythritol hexa(meth)acrylate and the like are preferably mentioned.

On the other hand, a (meth)acryloyl group-containing compound having a urethane bond in its molecule (hereinafter referred to as an acrylic urethane) may be preferably used, since the urethane bond functions as a pseudo crosslinking site by the action of the hydrogen bond, and sufficiently high degree abrasion resistance can be obtained even when the molecular weight per functional group is not so small as above. The following compounds are preferred as a monomer (a-1) which satisfies such conditions.

A polyfunctional compound which is an acrylic urethane as a reaction product of pentaerythritol or polypentaerythritol, polyisocyanate and hydroxyalkyl (meth)acrylate, and which has at least three, preferably from 4 to 20, (meth)acryloyl groups.

A polyfunctional compound which is an acrylic urethane as a reaction product of a hydroxyl group-containing poly(meth)acrylate of pentaerythritol or polypentaerythritol, and polyisocyanate, and which has at least three, more preferably from 4 to 20, (meth)acryloyl groups.

The composition (Q) may contain a polymerizable monomer other than the monomer (a-1), as the polymerizable monomer (A). The polymerizable monomer (A) other than the monomer (a-1) may be a nonfunctional polymerizable monomer having one (meth)acryloyl group in one molecule (hereinafter sometimes referred to as monomer (a-2)) or a compound having at least one polymerizable functional group other than a (meth)acryloyl group. However, a compound having a polymerizable functional group other than a (meth)acryloyl group is not sufficient in curing properties by active energy rays in many cases, and is hardly available, and thus the polymerizable monomer (A) other than the monomer (a-1) is preferably the monomer (a-2).

The monomer (a-2) may, for example, be an alkyl (meth)acrylate represented by the formula $CH_2=C(R^4)COOC_zH_{2z+1}$ (wherein $R^4$ is a hydrogen atom or a methyl group, and z is an integer of from 1 to 13, provided that $C_zH_{2z+1}$ may have a straight chain structure or a branched structure), allyl(meth)acrylate, benzyl (meth)acrylate, butoxyethyl(meth)acrylate, butanediol (meth)acrylate, butoxytriethylene glycol mono(meth)acrylate, t-butylaminoethyl(meth)acrylate, 3-chloro-2-hydroxypropyl(meth)acrylate, 2-cyanoethyl (meth)acrylate, cyclohexyl(meth)acrylate, 2,3-dibromopropyl(meth)acrylate, dicyclopentenyl (meth)acrylate, N,N-diethylaminoethyl(meth)acrylate, N,N-dimethylaminoethyl(meth)acrylate, 2-ethoxyethyl (meth)acrylate, 2-(2-ethoxyethoxy)ethyl(meth)acrylate, 2-ethylhexyl(meth)acrylate, glycerol (meth)acrylate, glycidyl (meth)acrylate, heptadecafluorodecyl (meth)acrylate, 2-hydroxyethyl(meth)acrylate, 2-hydroxy-3-(meth)acryloyloxypropyltrimethylammonium chloride, 2-hydroxypropyl (meth)acrylate, γ-(meth)acryloxypropyltrimethoxysilane, 2-methoxyethyl (meth)acrylate, methoxydiethylene glycol (meth)acrylate, methoxytriethylene glycol (meth)acrylate, methoxytetraethylene glycol (meth)acrylate, methoxydipropylene glycol (meth)acrylate, methoxylated cyclodecatriene (meth)acrylate, morpholine (meth)acrylate, nonylphenoxypolyethylene glycol (meth)acrylate, nonylphenoxypolypropylene glycol (meth)acrylate, octafluoropentyl(meth)acrylate, phenoxyhydroxypropyl (meth)acrylate, phenoxyethyl (meth)acrylate, phenoxydiethylene glycol (meth)acrylate, phenoxytetraethylene glycol (meth)acrylate, phenoxyhexaethylene glycol (meth)acrylate, phenoxy (meth)acrylate, polypropylene glycol (meth)acrylate, sodium 2-sulfonate ethoxy(meth)acrylate, tetrafluoropropyl(meth)acrylate, tetrahydrofurfuryl (meth)acrylate, trifluoroethyl(meth)acrylate, vinyl acetate, N-vinylcaprolactam, N-vinylpyrrolidone, dicyclopentadienyl(meth)acrylate, or isobornyl acrylate.

In the total mass of the polymerizable monomer (A) in the composition (Q), from 20 to 100 mass %, preferably from 50 to 100 mass %, more preferably from 70 to 100 mass %, is the monomer (a-1). When the proportion of the monomer (a-1) in the polymerizable monomer (A) contained in the composition (Q) is within this range, the hard coat layer (X) made of a cured product of the composition (Q) (hereinafter referred to simply as a hard coat layer (X)) will be particularly excellent in abrasion resistance.

In the composition (Q), the colloidal silica (B) is ultrafine particles of silicic anhydride dispersed in a dispersion medium in the form of colloid. The dispersion medium is not particularly limited, and usually, water; a lower alcohol such as methanol, ethanol, isopropanol, n-butanol or ethylene glycol; a cellosolve such as methyl cellosolve, ethyl cellosolve, butyl cellosolve or propylene glycol monomethyl ether acetate; dimethyl acetamide, toluene, xylene, methyl acetate, ethyl acetate, pentyl acetate, or acetone, may, for example, be used.

The average particle size of the colloidal silica (B) is from 1 to 200 nm, and in order to obtain high transparency of the hard coat layer (X), the average particle size is particularly preferably from 1 to 50 nm.

Further, in order to improve dispersion stability of the colloidal silica (B), the surface of the particles may be modified with a hydrolysate of a hydrolysable silane compound. Here, "the surface is modified with a hydrolysate" means such a state that a hydrolysate of a silane compound is physically or chemically bonded to part of or the entire silanol groups on the surface of the colloidal silica particles, whereby the surface properties are improved. Silica particles, to the surface of which a hydrolysate which further undergoes a condensation reaction is similarly bonded are also included. This surface modification can easily be carried out by subjecting a part of or the entire hydrolysable groups of the silane compound to hydrolysis or to hydrolysis and a condensation reaction in the presence of the silica particles.

The hydrolysable silane compound is preferably a silane compound wherein an organic group having a functional group such as a (meth)acryloyl group, an amino group, an epoxy group or a mercapto group, and a hydrolysable group such as an alkoxy group and/or a hydroxyl group, are bonded to a silicon atom. The hydrolysable group in the present specification means a group which may be hydrolyzed at the bonding portion with the silicon atom. Preferably, it may, for example, be 3-(meth)acryloyloxypropyltrimethoxysilane, 2-(meth)acryloyloxyethyltrimethoxysilane, 3-(meth)acryloyloxypropyltriethoxysilane, 2-(meth)acryloyloxyethyltriethoxysialne, 3-aminopropyltriethoxysilane, 3-aminopropyltrimethoxysilane, N-(2-aminoethyl)-3-aminopropylmethyldimethoxysilane, 3-glycidoxypropyltrimethoxysilane or 3-mercaptopropyltrimethoxysilane.

The hydrolysable silane compound is preferably a mercapto group-containing silane compound wherein an organic group having a mercapto group, and a hydrolysable group and/or a hydroxyl group, are bonded to a silicon atom, in view of high reactivity with the polymerizable monomer (A). Specifically, a compound represented by the following formula (6) will be exemplified as the mercapto group-containing silane compound.

$$HS-R-SiX_L R^0{}_{3-L} \qquad \text{Formula (6)}$$

wherein R is an alkylene group, $R^0$ is an alkyl group, X is a hydroxyl group or a hydrolysable group, and L is an integer of from 1 to 3.

In the above formula, R is preferably a $C_{2-6}$ (most preferably $C_3$) alkylene group, and $R^0$ is preferably an alkyl group having a carbon number of at most 4, particularly preferably a methyl group or an ethyl group. X is preferably a hydrolysable group, particularly preferably an alkoxy group having a carbon number of at most 4. Such an alkoxy group is more preferably a methoxy group or an ethoxy group in view of favorable hydrolysability. L is preferably from 2 to 3.

Typical examples of the mercapto group-containing silane compound represented by the above formula are shown below. Here, Me represents a methyl group, Et represents an ethyl group, and Pr represents a n-propyl group.

$HS-CH_2CH_2CH_2-Si(OMe)_3$, $HS-CH_2CH_2CH_2-Si(OEt)_3$, $HS-CH_2CH_2CH_2-Si(OPr)_3$, $HS-CH_2CH_2CH_2-SiMe(OMe)_2$, $HS-CH_2CH_2CH_2-SiMe(OEt)_2$, $HS-CH_2CH_2CH_2-SiMe(OPr)_2$, $HS-CH_2CH_2CH_2-SiMe_2(OMe)$, $HS-CH_2CH_2CH_2-SiMe_2(OEt)$, $HS-CH_2CH_2CH_2-SiMe_2(OPr)$, $HS-CH_2CH_2CH_2-SiCl_3$, $HS-CH_2CH_2CH_2-SiBr_3$, $HS-CH_2CH_2CH_2-SiMeCl_2$, $HS-CH_2CH_2CH_2-SiMeBr_2$, $HS-CH_2CH_2CH_2-SiMe_2Cl$ and $HS-CH_2CH_2CH_2-SiMe_2Br$.

Further, the hydrolysable silane compound is preferably a (meth)acryloyl group-containing silane compound wherein an organic group having a (meth)acryloyl group, and a hydrolysable group and/or a hydroxyl group, are bonded to a silicon atom, in view of high reactivity with the polymerizable monomer (A) and the stability of the bond. Specifically, a compound represented by the following formula (7) is preferred as the (meth)acryloyl group-containing silane compound.

$$CH_2=CH(R^5)COO-R-SiX_L R^0{}_{3-L} \qquad \text{Formula (7)}$$

wherein $R^5$ is a hydrogen atom or a methyl group, R is an alkylene group, $R^0$ is an alkyl group, X is a hydroxyl group or a hydrolysable group, and L is an integer of from 1 to 3.

In the above formula, R is preferably a $C_{2-6}$ (most preferably $C_3$) alkylene group, and $R^0$ is preferably an alkyl group having a carbon number of at most 4, particularly preferably a methyl group or an ethyl group. X is preferably a hydrolysable group, particularly preferably an alkoxy group having a carbon number of at most 4. Such an alkoxy group is more preferably a methoxy group or an ethoxy group in view of favorable hydrolysability. L is preferably from 2 to 3.

Typical examples of the (meth)acryloyl group-containing silane compound represented by the above formula are shown below.

$CH_2=C(R^5)COO-CH_2CH_2CH_2-Si(OMe)_3$, $CH_2=C(R^5)COO-CH_2CH_2CH_2-Si(OEt)_3$, $CH_2=C(R^5)COO-CH_2CH_2CH_2-Si(OPr)_3$, $CH_2=C(R^5)COO-CH_2CH_2CH_2-SiMe(OMe)_2$, $CH_2=C(R^5)COO-CH_2CH_2CH_2-SiMe(OEt)_2$, $CH_2=C(R^5)COO-CH_2CH_2CH_2-SiMe(OPr)_2$, $CH_2=C(R^5)COO-CH_2CH_2CH_2-SiMe_2(OMe)$, $CH_2=C(R^5)COO-CH_2CH_2CH_2-SiMe_2(OEt)$, $CH_2=C(R^5)COO-CH_2CH_2CH_2-SiMe_2(OP_r)$, $CH_2=C(R^5)COO-CH_2CH_2CH_2-SiCl_3$, $CH_2=C(R^5)COO-CH_2CH_2CH_2-SiBr_3$, $CH_2=C(R^5)COO-CH_2CH_2CH_2-SiMeCl_2$, $CH_2=C(R^5)COO-CH_2CH_2CH_2-SiMeBr_2$, $CH_2=C(R^5)COO-CH_2CH_2CH_2-SiMe_2Cl$ and $CH_2=C(R^5)COO-CH_2CH_2CH_2-SiMe_2Br$ In the composition (Q), the proportions of the polymerizable monomer (A) and the colloidal silica (B) are not particularly limited. However, it contains preferably from 5 to 300 parts by mass, more preferably from 10 to 200 parts by mass, of the colloidal silica (B) (solid content) per 100 parts by mass of the polymerizable monomer (A). When the proportion of the colloidal silica (B) is within the above range, a hard coat layer (X) to be formed, will be excellent in the abrasion resistance, transparency and mechanical strength when an external force is exerted. If the proportion of the colloidal silica (B) is less than 5 parts by mass, the hard coat layer (X) tends to be inferior in the abrasion resistance. On the other hand, if the proportion of the colloidal silica (B) exceeds 300 parts by mass, the hard coat layer (X) is likely to have a haze, and the hard coat layer (X) will be susceptible to cracking when the optical disk is forcibly deformed by an external force.

In the composition (Q), the lubricity-imparting agent (C) comprehensively represents a lubricity-imparting agent (C-T) which will be described below and other lubricity-imparting agent which will be described hereinafter.

In the composition (Q), the proportions of the polymerizable monomer (A) and the lubricity-imparting agent (C) are not particularly limited. However, it contains preferably from 0.01 to 10 parts by mass, more preferably from 0.1 to 5.0 parts by mass, of lubricity-imparting agent (C) per 100 parts by mass of the polymerizable monomer (A). When the proportion of the lubricity-imparting agent is within the above range, the hard coat layer (X) to be formed will be excellent in the surface lubricity and the abrasion resistance. If the proportion of the lubricity-imparting agent (C) is less than 0.01 part by mass, the hard coat layer (X) tends to be inferior in the surface lubricity. On the other hand, if the proportion of the lubricity-imparting agent (C) exceeds 10 parts by mass, the hard coat layer (X) itself tends to be plasticized, and the abrasion resistance tends to decrease.

In the composition (Q), the lubricity-imparting agent (C-T) is a compound having, in one molecule, a moiety (c-1) made of a portion represented by the formula (1), at least one moiety (c-2) selected from the group consisting of portions represented by the formulae (2) to (5), and an active energy ray curable functional group (c-3):

$$—(SiR^1R^2O)_m—$$ Formula (1)

wherein each of $R^1$ and $R^2$ is either a $C_{1-8}$ alkyl group or a phenyl group, and m is an integer of from 1 to 1,000, $$—R^3—$$ Formula (2)

$$—(CH_2CH_2O)_x—$$ Formula (3)

$$—(CH_2CH(CH_3)O)_y—$$ Formula (4)

$$—(C(=O)C_uH_{2u}O)_t—$$ Formula (5)

wherein $R^3$ is a $C_{6-20}$ alkylene group, each of x and y is an integer of from 5 to 100, u is an integer of from 3 to 5, and t is an integer of from 1 to 20.

The lubricity-imparting agent (C-T) has a moiety (c-1) made of a portion represented by the above formula (1) (hereinafter referred to simply as moiety (c-1)), whereby the hard coat layer (X) to be formed will be excellent in the surface lubricity. Specifically, the coefficients of dynamic friction on the surface of the hard coat layer (X) measured before and after a sliding resistance test in accordance with procedure as mentioned hereinafter, are both at most 0.1.

In the above formula (1), each of $R^1$ and $R^2$ may be the same or different in every siloxane unit. Specifically, the portion corresponding to the above formula (1) may, for example, be a dimethyl silicone unit, a methylphenyl silicone unit or a diphenyl silicone unit. m representing the degree of polymerization is an integer of from 1 to 1,000, preferably an integer of from 1 to 500. When m is within this range, the hard coat layer (X) will be excellent in the surface lubricity. If m exceeds 1,000, the viscosity tends to be too high, and the lubricity-imparting agent (C-T) is less likely to be mixed with other components in the composition (Q).

In the composition (Q), the lubricity-imparting agent (C-T) may have, in the same molecule, two or more types of the moieties (c-1) made of a portion represented by the formula (1), having different forms.

Further, in the composition (Q), as the lubricity-imparting agent (C-T), a plural types of lubricity-imparting agents (C-T) having moieties (c-1) having different forms may be used in combination.

In the lubricity-imparting agent (C-T), the moiety (c-2) having at least one portion selected from the group consisting of portions represented by the formulae (2) to (5) (hereinafter referred to as moiety (c-2)) has a function to exert compatibility with the polymerizable monomer (A).

The moiety (c-1) in the lubricity-imparting agent (C-T) has a low affinity with a resin matrix formed from the polymerizable monomer (A), and thus when the composition (Q) is cured, the lubricity-imparting agent (C-T) is likely to bleed out on the surface of the resin matrix, thus impairing transparency of the hard coat layer (X) after curing.

As the moiety (c-2) has excellent compatibility with the polymerizable monomer (A), the lubricity-imparting agent (C-T) has moderate compatibility with the polymerizable monomer (A) even though it has a moiety (c-1) having a low affinity with the polymerizable monomer (A).

In the composition (Q), the lubricity-imparting agent (C-T) has moderate compatibility with the polymerizable monomer (A), and thus when the composition (Q) is coated on the surface of a thin film cover layer, the lubricity-imparting agent (C-T) segregates on the surface of the coating film without impairing transparency of the coating film before curing. Thus, transparency of the hard coat layer (X) after curing will not be impaired.

The portion represented by the above formula (2) is a straight chain or branched alkylene group having a carbon number of from 6 to 20. When the carbon number is within this range, the compatibility of the lubricity-imparting agent (C-T) with the polymerizable monomer (A) tends to be moderate, and further, the crystallinity of the group will not be too strong, and thus the hard coat layer (X) will be excellent in surface lubricity and transparency. If the carbon number is at most 5, the compatibility with the polymerizable monomer (A) tends to be low, thus impairing transparency of the coating film before curing. This means that the transparency of the hard coat layer (X) after curing will be impaired. On the other hand, if the carbon number exceeds 20, the crystallinity of the group tends to be strong, and the transparency of the hard coat layer (X) will be impaired also.

The portion represented by the above formula (3) represents a unit of ethylene oxide. x representing the degree of polymerization is an integer of from 5 to 100. When x is within this range, the lubricity-imparting agent (C-T) has moderate compatibility with the polymerizable monomer (A), and thus the hard coat layer (X) will be excellent in surface lubricity and transparency. x is more preferably an integer of from 5 to 80. If x is at most 4, the compatibility of the lubricity-imparting agent (C-T) tends to be low, thus impairing the transparency of the hard coat layer (X). On the other hand, if x exceeds 100, the compatibility of the lubricity-imparting agent (C-T) tends to be too high, and the lubricity-imparting agent (C-T) will hardly segregate on the surface of the coating film, and thus the hard coat layer (X) will not have sufficient surface lubricity.

The portion represented by the above formula (4) represents a unit of propylene oxide. y representing the degree of polymerization is an integer of from 5 to 100. When y is within this range, the lubricity-imparting agent (C-T) has moderate compatibility with the polymerizable monomer (A), and thus the hard coat layer (X) will be excellent in surface lubricity and transparency. y is more preferably an integer of from 5 to 100. When y is at most 4, the compatibility of the lubricity-imparting agent (C-T) tends to be low, thus impairing transparency of the hard coat layer (X). On the other hand, if y exceeds 100, the compatibility of the lubricity-imparting agent (C-T) tends to be too high, and the lubricity-imparting agent (C-T) will hardly segregate on the coating film surface, and thus the hard coat layer will not have sufficient surface lubricity.

The portion represented by the above formula (5) represents a unit obtained from a ring-opened product from lactone. The carbon number of the group is preferably an integer of from 3 to 5 in view of availability. Further, t representing the degree of polymerization is an integer of from 1 to 20. When t is within this range, the crystallinity of the group will not be too strong, and the hard coat layer (X) will be excellent in transparency.

The lubricity-imparting agent (C-T) may have, as the moiety (c-2), any one of the portions represented by the above formulae (2) to (5), or may have two or more types of the portions in the same molecule.

In the composition (Q), as the lubricity-imparting agent (C-T), a plural types of lubricity-imparting agents (C-T) having different moieties (c-2) may be used in combination.

In the lubricity-imparting agent (C-T), the active energy ray curable functional group (c-3) (hereinafter sometimes referred to as functional group (c-3)) may be a functional group having radical reactivity, and specifically, a (meth)acryloyl group, an allyl group, a vinyl group, a vinyl ether group, a halogen group or a mercapto group may, for example, be preferably mentioned. A (meth)acryloyl group is particularly preferred in view of the radical reactivity and the stability of the chemical bond to be formed.

When the composition (Q) is cured by irradiation with active energy rays, the functional group (c-3) also undergoes curing reaction and is covalently bonded to the polymerizable monomer (A) constituting the resin matrix in a cured product of the composition (Q). Thus, the lubricity-imparting agent (C-T) which has the functional group (b-3), is bonded to a cured product of the composition (Q), i.e. the hard coat layer (X), by means of the covalent bond. Thus, no lubricity-imparting agent (C-T) which is not fixed on the surface of the hard coat layer (X) is present, and therefore, the lubricity-imparting agent (C-T) will not volatilize from the surface of the hard coat layer (X). Further, since the lubricity-imparting agent (C-T) is bonded to the hard coat layer (X), the surface lubricity will be maintained over a long period.

The lubricity-imparting agent (C-T) has, in its molecule, the moiety (c-1), the moiety (c-2) and the functional group (c-3). In the lubricity-imparting agent (C-T), the boding form of the respective moieties is not particularly limited. As the bonding form of the respective moieties in the lubricity-imparting agent (C-T), specifically, the following examples may be preferably mentioned.

1. Straight chain type: a type wherein the moiety (c-1), the moiety (c-2) and the functional group (c-3) are linearly connected. Hereinafter referred to as straight chain type.

With respect to the straight chain type, the raw material compound forming the moiety (c-1) is preferably a compound having the moiety (c-1) and having its terminal modified with a hydroxyl group. For example, polydimethylsilicone having its terminal modified with a hydroxyl group may be preferably mentioned.

By polymerizing a monomer such as ethylene oxide, propylene oxide or lactone to the terminal hydroxyl group of the compound having the moiety (c-1) and having its terminal modified with a hydroxyl group, the moiety (c-2) can be constituted adjacently to the moiety (c-1). Otherwise, a polymer such as polyethylene glycol or polypropylene glycol as the moiety (c-2) may be connected to the moiety (c-1) by means of a urethane bond using e.g. a bifunctional isocyanate. Further, to the terminal hydroxyl group of the compound having the moiety (c-1) and having its terminal modified with a hydroxyl group, ethylene carbonate may be added while decarboxylating it in the presence of a catalyst to insert one unit of ethylene oxide, and then the above propylene oxide, lactone or the like is polymerized to constitute the moiety (c-2).

By the operation so far, the terminal of the moiety (c-2) is a hydroxyl group. Thus, as a method of introducing the functional group (c-3) (such as a (meth)acryloyl group), a method of introducing it by means of an ester linkage using e.g. (meth)acrylic acid or (meth)acrylic acid chloride, a method of introducing it by means of a urethane bond using 2-(meth)acrylic acid ethyl isocyanate, or a method of introducing e.g. 2-hydroxyethyl(meth)acrylate, 3-hydroxypropyl (meth)acrylate or 4-hydroxybutyl(meth)acrylate by a urethane bond by means of a bifunctional isocyanate may, for example, be preferably mentioned.

Further, a method may also be preferably mentioned wherein one having one terminal of a polymer such as polyethylene glycol or polypropylene glycol already modified with a (meth)acryloyl group, is used and bonded to the hydroxyl group at the terminal of the moiety (c-1) by means of a urethane bond using e.g. a bifunctional isocyanate to connect the moiety (c-2) and the functional group (c-3) adjacently to the moiety (c-1) all at once.

2. Copolymerization type: a type wherein a radical polymerizable macromer having the moiety (c-1) and a radical polymerizable macromer having the moiety (c-2) are prepared, and such macromers are copolymerized, and then the functional group (c-3) is introduced. Hereinafter referred to as copolymerization type.

As the macromer having the moiety (c-1), one having one terminal of polydimethylsilicone modified with a (meth)acrylic acid may, for example, be preferably mentioned.

As the macromer having the moiety (c-2), one having one terminal of a polymer such as polyethylene glycol or polypropylene glycol modified with a (meth)acryloyl group, or one having one terminal of an alkyl ester of (meth)acrylic acid or a ring-opened polymer of lactone modified with a (meth)acryloyl group, may, for example, be preferably mentioned.

The functional group (c-3) may be introduced to the terminal of the copolymer of the above two macromers. For example, a method of introducing it to a hydroxyl group at one terminal at which no (meth)acryloyl group is added of the above two macromers, by means of an ester linkage using e.g. (meth)acrylic acid or (meth)acrylic acid chloride, or a method of introducing it by means of a urethane bond using 2-methacrylic acid ethyl isocyanate, may, for example, be preferably mentioned.

Otherwise, a method wherein the above two macromers and 2-hydroxyethyl(meth)acrylate, 3-hydroxypropyl (meth)acrylate, 4-hydroxybutyl(meth)acrylate or the like are copolymerized, and then the functional group (c-3) is introduced by means of an ester linkage using e.g. (meth)acrylic acid or (meth)acrylic acid chloride, or a method of introducing it by means of a urethane bond using 2-methacrylic acid ethyl isocyanate, may also be mentioned.

In either of the above straight chain type and copolymerization type, the functional group (c-3) is bonded preferably adjacently to the moiety (c-2). When the functional group (c-3) is bonded adjacently to the moiety (c-2), the surface migration characteristics of the moiety (c-1) tend to be high, and the hard coat layer (X) tends to be excellent in surface lubricity, as compared with a case where the functional group (c-3) is bonded adjacently to the moiety (c-1).

The lubricity-imparting agent (C) may contain a known lubricity-imparting agent other than the above lubricity-imparting agent (C-T). Such a known lubricity-imparting agent may, for example, be a silicone type lubricity-imparting agent represented by silicone oil, a fluorine type lubricity-imparting agent, a fatty acid ester type lubricity-imparting agent represented by fatty acid ester wax. However, the known lubricity-imparting agent in the present specification does not include compounds corresponding to the above lubricity-imparting agent (C-T). When such a known lubricity-imparting agent is contained, it is contained in an amount of at most 50 parts by mass, preferably 30 parts by mass, per 100 parts by mass of the total mass of the lubricity-imparting agents (C).

In the composition (Q), the active energy ray polymerization initiator (D) widely includes known photopolymerization initiators. The photopolymerization initiator is preferably a commercially available one which is particularly easily available. Further, a plural types of photopolymerization initiators may be used in combination.

Specifically, the known photopolymerization initiator may, for example, be an aryl ketone photopolymerization initiator (such as an acetophenone, a benzophenone, an alkylaminobenzophenone, a benzyl, a benzoin, a benzoin ether, a benzoin dimethyl ketal, a benzoyl benzoate or an α-acyloxime ester), a sulfur-containing photopolymerization initiator (such as a sulfide or a thioxanthone), an acylphosphine oxide photopolymerization initiator (such as an acylarylphosphine oxide) or other photopolymerization initiators. Further, the photopolymerization initiator may be used in combination with a photosensitizer such as an amine. The following compounds may be mentioned as specific photopolymerization initiators, however, the photopolymerization initiator is not limited thereto.

4-Phenoxydichloroacetophenone, 4-t-butyl-dichloroacetophenone, 4-t-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methylpropan-1-one, 1-hydroxycyclohexylphenylketone and 2-methyl-1-{4-(methylthio)phenyl}-2-morpholinopropan-1-one.

Benzoin, benzoin methyl ether, benzoin ethyl ether, benzoin isopropyl ether, benzoin isobutyl ether, benzyl dimethyl ketal, benzophenone, benzoyl benzoate, methyl benzoyl benzoate, 4-phenylbenzophenone, hydroxybenzophenone, benzophenone acrylate, 3,3'-dimethyl-4-methoxybenzophenone, 3,3',4,4'-tetrakis(t-butylperoxycarbonyl)benzophenone, 9,10-phenanthrenequinone, camphorquinone, dibenzosuberone, 2-ethylanthraquinone, 4,4'-diethylisophthalophenone, 1-phenyl-1,2-propanedione-2(o-ethoxycarbonyl)oxime and methyl phenyl glyoxylate.

4-Benzoyl-4'-methyldiphenyl sulfide, thioxanthone, 2-chlorothioxanthone, 2-methylthioxanthone, 2,4-dimethylthioxanthone, isopropylthioxantone, 2,4-dichlorothioxanthone, 2,4-diethylthioxanthone and 2,4-diisopropylthioxantone.

2,4,6-Trimethylbenzoyl diphenylphosphine oxide, benzoyl diphenylphosphine oxide, 2,6-dimethylbenzoyl diphenylphosphine oxide and bis(2,6-dimethoxybenzoyl)-2,4,4-trimethylpentylphosphine oxide.

In the composition (Q), the proportion of the active energy ray polymerization initiator (D) is also not particularly limited. However, the active energy ray polymerization initiator (D) is contained usually preferably in an amount of from 0.01 to 20 parts by mass, particularly preferably from 0.1 to 10 parts by mass, per 100 parts by mass of the polymerizable monomer (A). Within this range, curing properties of the composition (Q) will be sufficient, and all the active energy ray polymerization initiator (D) will decompose at the time of curing.

Accordingly, the composition (Q) particularly preferably contains, from 5 to 300 parts by mass of the colloidal silica (B), from 0.01 to 10 parts by mass of the lubricity-imparting agent (C), and from 0.1 to 20 parts by mass of the active energy ray polymerization initiator (D), per 100 parts by mass of the polymerizable monomer (A).

The composition (Q) may contain the following solvent or various other functional compounding agents in addition to the above basic components.

In a case where a solvent is used for the composition (Q), it is preferred to use a solvent in which the above basic components can be dissolved. Further, it is preferred to select a proper solvent depending upon the type of an optical disk substrate. Specifically, it may, for example, be preferably an organic solvent such as a lower alcohol such as ethyl alcohol, butyl alcohol or isopropyl alcohol, a ketone such as methyl isobutyl ketone, methyl ethyl ketone or acetone, an ether such as dioxane, diethylene glycol dimethyl ether, tetrahydrofuran, methyl-t-butyl ether or hydroquinone monomethyl ether, or a cellosolve such as methyl cellosolve, ethyl cellosolve, butyl cellosolve or propylene glycol monomethyl ether acetate. In addition, an ester such as methyl acetate, ethyl acetate, butyl acetate, isoamyl acetate, ethyl lactate or a dibasic acid ester such as diethyl succinate, diethyl adipate, dibutyl phathalate or dioctyl phthalate, a halogenated hydrocarbon such as a chlorofluorohydrocarbon, a chlorinated hydrocarbon such as trichloroethane or a fluorinated hydrocarbon, or a hydrocarbon such as toluene, xylene or hexane may also be used.

Further, the amount of the solvent used may optionally be changed depending upon conditions such as the required viscosity of the composition (Q), the aimed thickness of the hard coat layer (X) and the drying temperature. In the present invention, the solvent is used in an amount of preferably at most 100 times, more preferably from 0.1 to 50 times, the amount of the polymerizable monomer (A) by mass.

The above other functional compounding agents may be at least one functional compounding agent selected from the group consisting of an ultraviolet absorber, a photostabilizer, an antioxidant, a thermal polymerization inhibitor, a leveling agent, a defoaming agent, a thicker, a sedimentation-preventing agent, a pigment (organic coloring pigment, inorganic pigment), a coloring dye, an infrared absorber, a fluorescent brighter, a dispersant, an antifouling property-imparting agent, electroconductive fine particles, an antistatic agent, an anti-fogging agent and a coupling agent.

The ultraviolet absorber is preferably a benzotriazole ultraviolet absorber, a benzophenone ultraviolet absorber, a salicylic acid ultraviolet absorber, a phenyltriazine ultraviolet absorber or the like, which is commonly used as an ultraviolet absorber for a synthetic resin. Specifically, the compounds disclosed in paragraph 0078 of JP-A-11-268196 may be mentioned. In the present invention, as the composition (Q) contains a polyfunctional polymerizable monomer (a-1), particularly preferred is one having a photopolymerizable functional group in its molecule, such as 2-{2-hydroxy-5-(2-acryloyloxyethyl)phenyl}benzotriazole or 2-hydroxy-3-methacryloyloxypropyl-3-(3-benzotriazole-4-hydroxy-5-t-butylphenyl)propionate.

The photostabilizer is preferably a hindered amine photostabilizer which is commonly used as a photostabilizer for a synthetic resin. Specifically, the compounds disclosed in paragraph 0080 of JP-A-268196, may be mentioned. In the present invention, one having a polymerizable functional group in its molecule such as N-methyl-4-methacryloyloxy-2,2,6,6-tetramethylpiperidine is particularly preferred.

The antioxidant may, for example, be a hindered phenol antioxidant such as 2,6-di-t-butyl-p-cresol or a phosphorus type antioxidant such as triphenylphosphite. The thermal polymerization initiator may, for example, be hydroquinone monomethyl ether. Further, the leveling agent may, for example, be a silicone resin leveling agent or an acryl resin leveling agent.

The defoaming agent may, for example, be a silicone resin defoaming agent such as polydimethylsiloxane. The thickener may, for example, be a polymethyl methacrylate polymer, a hydrogenated castor oil compound or a fatty acid amide compound.

The organic coloring pigment may, for example, be a condensed polycyclic organic pigment or a phthalocyanine organic pigment. The inorganic pigment may, for example, be titanium dioxide, cobalt oxide, molybdenum red or titanium black. Further, the coloring dye may, for example, be an organic solvent-soluble azo metal complex salt dye or an organic solvent-soluble phthalocyanine dye.

The infrared absorber may, for example, be a polymethine, phthalocyanine, metal complex, aminium, diimonium, anthraquinone, dithiol metal complex, naphthoquinone, indole phenol, azo or triarylmethane compound.

The antifouling property-imparting agent may, for example, be a silicone resin antifouling additive or a fluororesin antifouling additive.

The electroconductive fine particles may, for example, be a metal powder of zinc, aluminum, nickel, etc, iron phosphide or antimony doped tin oxide.

The antistatic agent may, for example, be a nonionic antistatic agent, a cationic antistatic agent or an anionic antistatic agent.

The coupling agent may, for example, be a silane coupling agent or a titanate coupling agent.

In the present invention, the thickness of the hard coat layer (X) is preferably from 0.1 to 20 μm, particularly preferably from 0.5 to 10 μm. With the above range, the hard coat layer (X) will be excellent in the abrasion resistance and mechanical strength. If the thickness of the hard coat layer (X) exceeds 20 μm, not only no further improvement in surface characteristics such as abrasion resistance can be expected, but also the layer tends to be fragile, and cracks and the like may form on the hard coat layer (X) even by a slight deformation of an optical disk. Further, if the thickness of the hard coat layer (X) is less than 0.1 μm, no sufficient abrasion resistance of the hard coat layer (X) may be obtained.

Now, the optical disk substrate will be described.

As the optical disk substrate, preferably a substrate having a guide groove directly formed on a glass or a transparent resin such as polycarbonate, polymethylmethacrylate or an amorphous polyolefin, or a substrate having a guide groove formed by a photopolymer method on a glass or the above transparent resin, may, for example, be mentioned.

On the surface of the guide groove of the above optical disk substrate, a laminated film comprising the following dielectric film, recording film, reflective film, etc., will be formed. The materials of the respective films are not particularly limited.

As the material for the dielectric film, for example, $Si_3N_4$, $SiO_2$, AlSiON, AlSiN, AlN, AlTiN, $Ta_2O_5$ or ZnS may, preferably, be mentioned.

The material for the recording film varies depending upon the recording system. For example, for a recordable optical recording medium, a chalcogenite type alloy of Te, Sn, Se, etc., may, for example, be mentioned; for a phase change type optical recording medium, a chalcogenite type alloy of $TeO_x$, InSe, SnSb, etc., may, for example, be mentioned; and for a magnetooptical disk, an alloy of a transition metal and a rare earth metal, such as TbFeCo or NdDyFeCo (a single layer or an exchange coupling film of two or more layers) may preferably be mentioned.

The material for the reflective film may, for example, preferably be a metal such as Al, Au, Ag or Cu, or an alloy such as Al—Ti or Al—Cr.

The optical disk of the present invention may, for example, be produced as follows.

On the surface of the above optical disk substrate having a guide groove, a laminated film (a recording layer) comprising a dielectric film, a recording film, a reflective film, etc., is formed by a usual method. The dielectric film, the recording film and the reflective film are respectively formed by a physical vapor deposition method such as sputtering or ion plating, or a chemical vapor deposition method such as plasma CVD.

In the present invention, a thin film cover layer is formed on the surface of a recording layer of an optical disk. As a method for forming the thin film cover layer, a method in which a curable resin or the like is uniformly coated by a coating method such as spin coating, a roll coater method or screen printing, followed by curing by irradiation with active energy rays such as ultraviolet rays or electron rays and/or thermal curing, or a method in which a resin film having a predetermined thickness is bonded via an adhesive layer, may, for example, be mentioned.

Such a thin film cover layer is not particularly limited, and a known or well known layer may be employed. For example, as the above resin film having a predetermined thickness, a cast polycarbonate film may, for example, be mentioned. Otherwise, such a thin film cover layer may be formed by using a polyfunctional urethane (meth)acrylate compound as disclosed in paragraphs 0024 to 0036 in JP-A-11-240103 (hereinafter sometimes referred to as compound (E)). As such a compound (E), particularly preferred is a bifunctional compound having a mass average molecular weight of at least 1,500 and at most 20,000. By using a bifunctional compound, the curing shrinkage at the time of photopolymerization can be reduced. Further, by employing the mass average molecular weight within the above range, the viscosity of the composition for forming the thin film cover layer can be adjusted within a desired range, and a layer of at least 50 μm can be formed by single coating, and the coating operation will be facilitated. The compound (E) may be used in a single type alone or in combination of two or more types.

The thickness of the thin film cover layer is from 5 to 200 μm preferably from 40 to 160 μm. Within the above range, mechanical strength of the optical disk will be sufficient, and the allowance for a tilt and the allowance for non-uniformity in thickness of the optical disk are sufficiently large when a laser beam having a short wavelength of at most 650 nm is used for recording and retrieving data, and thus the optical characteristics of the optical disk will not be impaired. Further, with respect to the thickness of this layer, the desired value will be accurately determined from the optical design of an optical recording and retrieving device.

Further, the thin film cover layer may be formed on the recording layer via an adhesive layer, and the adhesive layer is preferably made of an ultraviolet curable resin. Further, the thickness of the adhesive layer is preferably from 0.5 to 50 μm, particularly preferably from 1 to 30 μm.

The method for forming the hard coat layer (X) on the surface of the recording layer of an optical disk via the thin film cover layer, is not particularly limited, and a known or well-known method may be employed. For example, as a method of coating the composition (Q) on the thin film cover layer, various methods may be employed, such as dipping, flow coating, spraying, bar coating, gravure coating, roll coating, blade coating, air-knife coating, spin coating, slit coating and microgravure coating.

The active energy rays used for curing the composition (Q) to form the hard coat layer (X), may, for example, be preferably ultraviolet rays, electron rays, X-rays, radioactive rays or high frequency waves. Ultraviolet rays having a wavelength of from 180 to 500 nm are particularly preferred from economical viewpoint.

As an active energy ray source, an ultraviolet ray irradiation apparatus such as a xenon lamp, a low-pressure mercury lamp, a high-pressure mercury lamp, a superhigh-pressure mercury lamp, a metal halide lamp, a carbon arc lamp or a tungsten lamp, an electron ray irradiation apparatus, an X-ray irradiation apparatus, a high frequency wave generation apparatus or the like may be used.

The optical disk in the present invention may be a single plate or one having at least two sheets bonded to one another. Further, if necessary, a hub may be attached, or the optical disk may be assembled into a cartridge.

EXAMPLES

Now, the present invention will be explained with reference to Examples of the present invention (Examples 1 to 9) and Comparative Example (Examples 10 to 12), however, the present invention is not limited thereto. In each Example, as an optical disk base, two types e.g. an optical disk base 1 and an optical disk base 2 were used.

Optical Disk Base 1

On one side (the surface having a guide groove) of a polycarbonate substrate (diameter: 12 cm, thickness: 1.1 mm) for an optical recording medium, a recording layer (a reflective film made of Al, a first dielectric film made of SiN, a magnetooptical recording film made of TbFeCo and a second dielectric film made of SiN) was formed by sputtering. A cast polycarbonate film (PURE-ACE, tradename, thickness: 70 μ) manufactured by Teijin Limited, as a thin film cover layer, was bonded on the surface of the recording layer via an adhesive layer (thickness: 28 μm).

Optical Disk Base 2

An optical disk base having the same structure as of the optical disk base 1 except that no reflective film was formed in the recording layer, was prepared as an optical disk base 2.

In each Example, two samples with different optical disk bases were prepared, and various physical properties were measured and evaluated in the following methods. The results are shown in Table 1.

The transparent optical disk base 2 was used as a sample for measuring the transparency, the abrasion resistance and the 400 nm light transmittance, and the optical disk base 1 having a reflective film formed thereon was used for measurement of the other physical properties.

Transparency

The haze (%) on four points of a sample was measured by a haze meter, and the average was calculated. The haze of the hard coat layer (X) of the sample was represented by the value (%) of (haze of the sample)−(haze of the optical disk base 2).

Abrasion Resistance

In accordance with an abrasion test in ISO9352, two CS-10F abrasive wheels were respectively combined with a weight of 500 g and rotated 500 cycles, whereupon the haze was measured by a haze meter. The measurement of the haze was carried out at four points on the cycle orbit of the abrasive wheels, and an average was calculated. The abrasion resistance was represented by the value (%) of (haze after abrasion test)−(initial haze).

400 nm Light Transmittance

By UV-3100 manufactured by Shimadzu Corporation, the light transmittance was measured at a wavelength of 400 nm. The transmittance of the hard coat layer (X) of the sample was represented by the value (%) of (light transmittance of the sample)−(light transmittance of the optical disk base 2).

Adhesive Properties

On the sample, eleven cut lines were imparted lengthwise and crosswise with spaces of 1 mm by an edge of a razor to form 100 crosscut sections, and a commercially available cellophane tape was intimately adhered and then rapidly pulled for peeling at an angle of 90°, whereby the number of crosscut sections where the hard coat layer remained without being peeled is represented by the number.

Surface Lubricity

As the index of the surface lubricity, the coefficient of dynamic friction on the surface of the hard coat layer was measured by using slipping tester HEIDON-14, manufactured by HEIDON COMPANY. As the index of the persistency of the surface lubricity, the coefficient of dynamic friction after a sliding resistance test was measured. The sliding resistance test is carried out in such a manner that magnetic head RF320-74G manufactured by Sony Corporation is brought into contact with a disk so that the load will be 2 g under environmental conditions of a temperature of 50±2° C. and a relative humidity of 50±5%, and the disk is continuously rotated at a rotational speed of 600 rpm for 5,000,000 times.

Raw Material Compounds

1) Polymerizable monomer (A):
Polyfunctional polymerizable monomer (a-1)
A-1: An acrylic urethane having a molecular weight of 2,300 and an average number of acryloyl groups per molecule of 15, obtained by reacting hydroxyl group-containing dipentaerythritol polyacrylate and hexamethylene diisocyanate.
A-2: Dipentaerythritol hexaacrylate.
Monofunctional polymerizable monomer (a-2)
A-3: Isobornyl acrylate.
2) Active energy ray polymerization initiator (D)
D-1: 2-Methyl-1-(4-metylthiophenyl)-2-morpholino-propan-1-one.
3) Colloidal silica (B)
B-1: Colloidal silica having a hydrolyzed condensate of a mercapto group-containing silane compound on its surface, obtained in such a manner that 2.5 parts by mass of 3-mercaptopropyltrimethoxysilane was added to 100 parts by mass of ethyl cellosolve dispersion type colloidal silica (silica content 30 mass %, average particle size 11 nm) and stirred at 80° C. for 5 hours under heating, followed by aging at room temperature for 12 hours.
B-2: Colloidal silica having a hydrolyzed condensate of a methacryloyl group-containing silane compound on its surface, obtained in such a manner that 2.5 parts by mass of 3-methacryloyloxypropyltrimethoxysilane was added to 100 parts by mass of propylene glycol monomethyl ether acetate dispersion type colloidal silica (silica content 30 mass %, average particle size 11 nm) and stirred at 50° C. for 3 hours, followed by aging at room temperature for 12 hours.

Preparation of Lubricity-Imparting Agent (C-T)

The following number average molecular weight is a value measured by means of gel permeation chromatography employing polystyrene as a standard substance.

(C1): Into a 300 mL four-necked flask equipped with a stirrer, 100 g of an oil having a unit of polypropylene oxide added to both terminals of dimethylsilicone oil (X-22-4952, manufactured by Shin-Etsu Chemical Co., Ltd., hydroxyl value=29, number average molecular weight: about 3,870), 50 mg of dibutyltin dilaurate and 250 mg of 2,6-di-t-butyl-p-cresol were added, followed by stirring at room temperature for 30 minutes, and then 12.6 g of 2-methacryloyloxyethyl isocyanate was added thereto, followed by stirring at room temperature further for 24 hours, to obtain a lubricity-imparting agent (C1) having both terminals modified with a methacryloyl group. The number average molecular weight of C1 was about 4,200.

(C2): Into a 300 mL four-necked flask equipped with a stirrer and a condenser, 80 mg of titanium tetraisobutoxide, 100 of dimethylsilicone oil having a hydroxyl group on one terminal (X-22-170BX, manufactured by Shin-Etsu Chemical Co., Ltd., hydroxyl value=18.5, number average molecular weight=3,000) and 25 g of $\epsilon$-caprolactone were added and heated at 150° C. for 5 hours, to obtain a white waxy compound having $\epsilon$-caprolactone added by ring-opening to one terminal of the dimethylsilicone oil (degree of polymerization of caprolactone=6.6). Then, the reaction composition was cooled to room temperature, 50 g of butyl acetate and 250 mg of 2,6-di-t-butyl-p-cresol were added thereto, followed by stirring for about 30 minutes, and then 5.05 g of 2-methacryloyloxyethyl isocyanate was added thereto, followed by stirring at room temperature further for 24 hours, to obtain a butyl acetate solution of a lubricity-imparting agent (C2) having one terminal modified with a methacryloyl group, having a solid content of 72%. The number average molecular weight of C2 was about 3,750.

(C3): Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 45 g of a dimethylsilicone macromer having one terminal modified with a methacryloyl group (X-22-174DX, manufactured by Shin-Etsu Chemical Co., Ltd., number average molecular weight: 5,000) and 15 g of a macromer having one terminal of polypropylene oxide modified with an acryloyl group (BLENMER AP-800, manufactured by NOF CORPORATION, $CH_2=CHCOO—(CH_2CH(CH_3)O)_y—H$, $y\approx 0.13$, hydroxyl value=66.8) were added thereto, followed by nitrogen purge, and then stirring and polymerization were carried out at 70° C. for 18 hours. As a result, a polymer having a number average molecular weight of 10,000 was obtained. Then, the reaction composition was cooled to room temperature, 50 mg of dibutyltin dilaurate and 100 mg of 2,6-di-t-butyl-p-cresol were added thereto, followed by stirring at room temperature for 30 minutes, and then 2.27 g of 2-methacryloyloxyethyl isocyanate was added thereto, followed by stirring at room temperature further for 24 hours, to obtain a butyl acetate solution of a lubricity-imparting agent (C3) having the polypropylene oxide terminal of the polymer units of the copolymer modified with a methacryloyl group, having a solid content of about 25%. The number average molecular weight of C3 was about 10,450.

(C4): Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 45 g of a dimethylsilicone macromer having one terminal modified with a methacryloyl group (X-22-174DX, manufactured by Shin-Etsu Chemical Co., Ltd., number average molecular weight: 5,000) and 15 g of a macromer having one terminal of polyethylene oxide modified with an acryloyl group (BLENMER AE-200, manufactured by NOF CORPORATION, $CH_2=CHCOO—(C_2H_4O)_n—H$, $n\approx 4.5$, hydroxyl value=174) were added thereto, followed by nitrogen purge, and then stirring and polymerization were carried out at 70° C. for 18 hours. As a result, a polymer having a number average molecular weight of 10,000 was obtained. Then, the reaction composition was cooled to room temperature, 50 mg of dibutyltin dilaurate and 100 mg of 2,6-di-t-butyl-p-cresol were added thereto, followed by stirring at room temperature for 30 minutes, and then 7.14 g of 2-methacryloyloxyethyl isocyanate was added thereto, followed by stirring at room temperature further for 24 hours, to obtain a butyl acetate solution of a lubricity-imparting agent (C4) having the polyethylene oxide terminal of the polymer units of the copolymer modified with a methacryloyl group, having a solid content of about 25%. The number average molecular weight of C4 was about 11,200.

(C5): Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 35 g of a dimethylsilicone macromer having one terminal modified with a methacryloyl group (X-22-174DX, manufactured by Shin-Etsu Chemical Co., Ltd., number average molecular weight: 5,000), 20 g of stearyl acrylate and 5 g of 2-hydroxyethyl acrylate were added thereto, followed by nitrogen purge, and then stirring and polymerization were carried out at 70° C. for 18 hours. As a result, a polymer having a number average molecular weight of 25,000 was obtained. Then, the reaction composition was cooled to room temperature, 50 mg of dibutyltin dilaurate and 100 mg of 2,6-di-t-butyl-p-cresol were added thereto, followed by stirring at room temperature for 30 minutes, and then 6.61 g of 2-methacryloyloxyethyl isocyanate was added thereto, followed by stirring at room temperature further for 24 hours, to obtain a butyl acetate solution of a lubricity-imparting agent (C5) having the 2-hydroxyethyl acrylate terminal of the polymer units of the copolymer modified with a methacryloyl group, having a solid content of about 25%. The number average molecular weight of C5 was about 28,000.

(C6): Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 45 g of a dimethylsilicone macromer having one terminal modified with a methacryloyl group (X-22-174DX, manufactured by Shin-Etsu Chemical Co., Ltd., number average molecular weight: 5,000) and 15 g of unsaturated fatty acid hydroxyalkyl ester-modified $\epsilon$-caprolactone (PLACCEL FA2D, manufactured by DAICEL CHEMICAL INDUSTRIES, LTD., degree of polymerization of caprolactone=2) were added thereto, followed by nitrogen purge, and then stirring and polymerization were carried out at 70° C. for 18 hours. As a result, a polymer having a number average molecular weight of 35,000 was obtained. Then, the reaction composition was cooled to room temperature, 50 mg of dibutyltin dilaurate and 100 mg of 2,6-di-t-butyl-p-cresol were added thereto, followed by stirring at room temperature for 30 minutes, and then 6.69 g of 2-methacryloyloxyethyl isocyanate was added thereto, followed by stirring at room temperature further for 24 hours, to obtain a butyl acetate solution of a lubricity-imparting agent (C6) having the unsaturated fatty acid hydroxyalkyl ester-modified $\epsilon$-caprolactone terminal of the polymer units of the copolymer modified with a methacryloyl group, having a solid content of about 25%. The number average molecular weight of C6 was about 39,000.

(C7): An oil having a unit of polypropylene oxide added to both terminals of dimethylsilicone oil (X-22-4952, manufactured by Shin-Etsu Chemical Co., Ltd., hydroxyl value=29, number average molecular weight: about 3,870). An example of the lubricity-imparting agent having no active energy curable functional group (c-3).

(C8): An oil having a methacryloyl group added to both terminals of dimethylsilicone oil (X-22-164C, manufactured by Shin-Etsu Chemical Co., Ltd., number average molecular weight of dimethylsilicone unit=5,000). An example of the lubricity-imparting agent having no moiety (c-2).

(C9): Dimethylsilicone oil having methyl groups on both terminals (KF96-50, manufactured by Shin-Etsu Chemical Co., Ltd.). An example of the lubricity-imparting agent having no moiety (c-2) nor functional group (c-3).

added thereto, followed by stirring for 1 hour at room temperature in a light shielding state to obtain a composition (Q1).

Then, the composition (Q1) was coated on the surface of a thin film cover layer of an optical disk base by spin coating (wet thickness: 6 μm) and held in a circulating hot air oven at 90° C. for 1 minute to remove the solvent. Then, the obtained coating film was irradiated with ultraviolet rays of 1,000 mJ/cm$^2$ (integrated energy amount of ultraviolet rays in a wavelength region of from 300 to 390 nm) using a high-pressure mercury lamp in the air atmosphere to form a transparent cured product layer with a film thickness of 1.8 μm. In such a manner, a sample 1 having adhesive layer/thin

TABLE 1

| | | |
|---|---|---|
| C1 | Straight chain type | $CH_2=C(CH_3)COOC_2H_4NHCO-(OCH_2CH(CH_3))_y-OC_3H_6-$ $(Si(CH_3)_2O)_m-Si(CH_3)_2-$ $C_3H_6O-(CH_2CH(CH_3)O)_y-CONHC_2H_4OCOC(CH_3)=CH_2$ $m \approx 21, y \approx 18$ |
| C2 | Straight chain type | $CH_3(Si(CH_3)_2O)_m-Si(CH_3)_2-C_3H_6O-(C(=O)C_5H_{10}O)_t-$ $CONHC_2H_4OCOC(CH_3)=CH_2$ $m \approx 38.4, t \approx 6.6$ |
| C3 | Copolymerization type | $-[CH_2-C(CH_3)CO\{P\}]_f-[CH_2-CHCO\{Q\}]_g-$ $f \approx 1.5, g \approx 3.0,$ $\{P\}: -OC_3H_6-(Si(CH_3)_2O)_m-Si(CH_3)_2-C_3H_7 (m \approx 60)$ $\{Q\}: -O-(CH_2CH(CH_3)O)_y-CONHC_2H_4OCOC(CH_3)=CH_2$ $(y \approx 13)$ |
| C4 | Copolymerization type | $-[CH_2-C(CH_3)CO\{P\}]_f-[CH_2-CHCO\{Q\}]_g-$ $f \approx 1.5, g \approx 7.8$ $\{P\}: -OC_3H_6-(Si(CH_3)_2O)_m-Si(CH_3)_2-C_3H_7 (m \approx 60)$ $\{Q\}: -O-(CH_2CH_2O)_x-CONHC_2H_4OCOCH(CH_3)=CH_2 (x \approx 4.5)$ |
| C5 | Copolymerization type | $-[CH_2-C(CH_3)CO\{P\}]_f-[CH_2-CHCO\{Q\}]_g-[CH_2-CHCO\{R\}]_h-$ $f \approx 2.9, g \approx 25, h \approx 18$ $\{P\}: -OC_3H_6-(Si(CH_3)_2O)_m-Si(CH_3)_2-C_3H_7 (m \approx 60)$ $\{Q\}: -OC_{18}H_{37}$ $\{R\}: -OCH_2CH_2O-CONHC_2H_4OCOCH(CH_3)=CH_2$ |
| C6 | Copolymerization type | $-[CH_2-C(CH_3)CO\{P\}]_f-[CH_2-CHCO\{Q\}]_g-$ $f \approx 5.3, g \approx 25$ $\{P\}: -OC_3H_6-(Si(CH_3)_2O)_m-Si(CH_3)_2-C_3H_7 (m \approx 60)$ $\{Q\}: -OC_2H_4-O-(C(=O)C_5H_{10}O)_t-$ $CONHC_2H_4OCOCH(CH_3)=CH_2 (t \approx 2)$ |
| C7 | No fucntional group (c-3) | $H-(OCH_2CH(CH_3))_y-OC_3H_6-(Si(CH_3)_2O)_m-Si(CH_3)_2-$ $C_3H_6O-(CH_2CH(CH_3)O)_y-H$ $m \approx 21, y \approx 18$ |
| C8 | No moiety (c-2) | $CH_2=C(CH_3)CO-OC_3H_6-(Si(CH_3)_2O)_m-Si(CH_3)_2-C_3H_6O-$ $COC(CH_3)=CH_2$ $m \approx 59.5$ |
| C9 | No moiety (c-2) nor functional group (c-3) | $CH_3-(Si(CH_3)_2O)_m-Si(CH_3)_2-CH_3$ |

Example 1

Into a 300 mL four-necked flask equipped with a stirrer and a condenser, 80 g of the polyfunctional polymerizable monomer A2, 1.0 g of the lubricity-imparting agent C1, 4.0 g of the active energy ray polymerization initiator D1, 1.0 g of hydroquinone monomethyl ether as a thermal polymerization inhibitor, and 65.0 g of butyl acetate (AcBt) as an organic solvent were put and stirred for 1 hour at room temperature in a light shielding state for homogenization. Then, with stirring, 75.0 g of the colloidal silica B1 was slowly added and further stirred for 1 hour at room temperature in a light shielding state for homogenization. Then, 65.0 g of dibutyl ether (DBE) as an organic solvent was film cover layer/hard coat layer (total film thickness: 99.8 μm) formed on the surface of the recording layer was obtained.

Using the present sample, evaluations were carried out with respect to the above items i.e. the transparency, the abrasion resistance, the 400 nm light transmittance, the adhesive properties and the surface lubricity. The results are shown in Table 3.

Examples 2 to 12

A composition having the same composition as the composition (Q) of Example 1 was produced except that the types and amounts of the polymerizable monomer (A), the colloidal silica (B) and the lubricity-imparting agent (C) in the composition (Q) of Example 1 were changed to the types and amounts as identified in Table 2, and using this composition, the same sample as in Example 1 was produced and evaluated with respect to the above items i.e. the transparency, the abrasion resistance, the 400 nm light transmittance, the adhesive properties and the surface lubricity. The results are shown in Table 3.

TABLE 2

| | A | B | C | D | AcBt | DBE |
|---|---|---|---|---|---|---|
| Ex. 1 | A2: 80 g | B1: 75 g | C1: 1.0 g | D1: 4.0 g | 65.0 g | 65.0 g |
| Ex. 2 | A2: 80 g | B1: 75 g | C2: 1.0 g | D1: 4.0 g | 65.0 g | 65.0 g |
| Ex. 3 | A2: B0 g | B1: 75 g | C3: 1.0 g | D1: 4.0 g | 65.0 g | 65.0 g |
| Ex. 4 | A2: 80 g | B1: 75 g | C4: 1.0 g | D1: 4.0 g | 65.0 g | 65.0 g |
| Ex. 5 | A2: 80 g | B1: 75 g | C5: 1.0 g | D1: 4.0 g | 65.0 g | 65.0 g |
| Ex. 6 | A2: 80 g | B1: 75 g | C6: 1.0 g | D1: 4.0 g | 65.0 g | 65.0 g |
| Ex. 7 | A1: 80 g | B1: 75 g | C1: 1.0 g | D1: 4.0 g | 65.0 g | 65.0 g |
| Ex. 8 | A2: 60 g A3: 20 g | B1: 75 g | C2: 1.0 g | D1: 4.0 g | 65.0 g | 65.0 g |
| Ex. 9 | A2: 80 g | B2: 75 g | C2: 1.0 g | D1: 4.0 g | 65.0 g | 65.0 g |
| Ex. 10 | A2: 80 g | B1: 75 g | C7: 1.0 g | D1: 4.0 g | 65.0 g | 65.0 g |
| Ex. 11 | A2: 80 g | B1: 75 g | C8: 1.0 g | D1: 4.0 g | 65.0 g | 65.0 g |
| Ex. 12 | A2: 80 g | B1: 75 g | C9: 1.0 g | D1: 4.0 g | 65.0 g | 65.0 g |

TABLE 3

| | Transparency haze (%) | Abrasion resistance (%) | 400 nm light transmittance (%) | Adhesive properties (number) | Surface lubricity (coefficient of dynamic friction) | |
|---|---|---|---|---|---|---|
| | | | | | Initial | After sliding resistance test |
| Ex. 1 | 0.1 | 2.7 | 90.9 | 100 | 0.05 | 0.07 |
| Ex. 2 | 0.2 | 2.9 | 90.7 | 100 | 0.04 | 0.06 |
| Ex. 3 | 0.2 | 2.6 | 90.0 | 100 | 0.06 | 0.07 |
| Ex. 4 | 0.1 | 2.4 | 90.4 | 100 | 0.05 | 0.07 |
| Ex. 5 | 0.2 | 2.5 | 90.8 | 100 | 0.06 | 0.08 |
| Ex. 6 | 0.2 | 2.8 | 90.9 | 100 | 0.05 | 0.06 |
| Ex. 7 | 0.2 | 2.3 | 90.0 | 100 | 0.05 | 0.06 |
| Ex. 8 | 0.3 | 3.3 | 91.0 | 100 | 0.05 | 0.07 |
| Ex. 9 | 0.2 | 2.9 | 91.2 | 100 | 0.07 | 0.07 |
| Ex. 10 | 0.3 | 3.5 | 90.4 | 100 | 0.05 | 0.70 |
| Ex. 11 | 1.5 | 3.4 | 87.2 | 100 | 0.04 | 0.11 |
| Ex. 12 | 3.5 | 3.6 | 81.5 | 100 | 0.03 | 0.85 |

According to the present invention, an optical disk of a type wherein a recording layer and a thin film cover layer are laminated on the surface of a substrate in this order, and the recording layer is to be irradiated through the thin film cover layer with a laser beam having a short wavelength represented by a blue laser to be used for recording and/or retrieving data, wherein a hard coat layer having excellent abrasion resistance and long-term surface lubricity and favorable transparency, is formed on the surface of the thin film cover layer, can be provided.

The entire disclosure of Japanese Patent Application No. 2002-333366 filed on Nov. 18, 2002 including specification, claims, drawings and summary are incorporated herein by reference in its entirety.

What is claimed is:

1. An optical disk of a system wherein a recording layer and a thin film cover layer with a thickness of from 5 to 200 μm, are laminated on a substrate in this order, and the recording layer is to be irradiated through the thin film cover layer with a blue laser beam to be used for recording and/or retrieving data, wherein a hard coat layer (X) is formed on the thin film cover layer, and the hard coat layer (X) is made of a cured product of an active energy ray curable composition (Q) comprising an active energy ray curable polymerizable monomer (A), a colloidal silica (B) having an average particle size of from 1 to 200 nm, a lubricity-imparting agent (C) and an active energy ray polymerization initiator (D), provided that the polymerizable monomer (A) contains at least 20 mass % of a polyfunctional polymerizable monomer (a-1) having at least two polymerizable functional groups selected from the group consisting of an acryloyl group and a methacryloyl group in one molecule, in the total mass of the polymerizable monomer (A) contained in the curable composition (Q), and the lubricity-imparting agent (C) contains a lubricity-imparting agent (C-T) having, in one molecule, a moiety (c-1) made of a portion represented by the following formula (1), at least one moiety (c-2) selected from the group consisting of portions represented by the following formulae (2) to (5), and an active energy ray curable functional group (c-3):

$$-(SiR^1R^2O)_m-\qquad\text{Formula (1)}$$

wherein each of $R^1$ and $R^2$ is either a $C_{1-8}$ alkyl group or a phenyl group, and m is an integer of from 1 to 1,000, $$-R^3-\qquad\text{Formula (2)}$$

$$-(CH_2CH_2O)_x-\qquad\text{Formula (3)}$$

$$-(CH_2CH(CH_3)O)_y-\qquad\text{Formula (4)}$$

$$-(C(=O)C_uH_{2u}O)_t-\qquad\text{Formula (5)}$$

wherein $R^3$ is a $C_{6-20}$ alkylene group, each of x and y is an integer of from 5 to 100, u is an integer of from 3 to 5, and t is an integer of from 1 to 20.

2. The optical disk according to claim 1, wherein the active energy ray curable composition (Q) comprises 100 parts by mass of the polymerizable monomer (A), from 5 to 300 parts by mass of the colloidal silica (B) having an average particle size of from 1 to 200 nm, from 0.01 to 10 parts by mass of the lubricity-imparting agent (C), and from 0.01 to 20 parts by mass of the active energy ray polymerization initiator (D).

3. The optical disk according to claim 1, wherein the colloidal silica (B) is a modified colloidal silica obtained by surface modification with a mercapto group-containing silane compound wherein an organic group having a mercapto group, and a hydrolysable group and/or a hydroxyl group, are bonded to a silicon atom.

4. The optical disk according to claim 3, wherein the mercapto group-containing silane compound is a compound represented by the following formula (6):

wherein R is an alkylene group, $R^0$ is an alkyl group, X is a hydroxyl group or a hydrolysable group, and L is an integer of from 1 to 3.

5. The optical disk according to claim 1, wherein the colloidal silica (B) is a modified colloidal silica obtained by surface modification with a (meth)acryloyl group-containing silane compound wherein an organic group having a (meth)acryloyl group, and a hydrolysable group and/or a hydroxyl group, are bonded to a silicon atom.

6. The optical disk according to claim 5, wherein the (meth)acryloyl group-containing silane compound is a compound represented by the following formula (7):

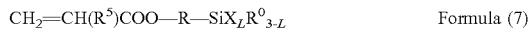

wherein $R^5$ is a hydrogen atom or a methyl group, R is an alkylene group, $R^0$ is an alkyl group, X is a hydroxyl group or a hydrolysable group, and L is an integer of from 1 to 3.

7. The optical disk according to claim 1, wherein the hard coat layer (X) has a thickness of from 0.1 to 20 μm.

8. The optical disk according to claim 1, wherein moiety (c-2) includes portions represented by formula (2).

9. The optical disk according to claim 1, wherein moiety (c-2) includes portions represented by formula (3).

10. The optical disk according to claim 1, wherein moiety (c-2) includes portions represented by formula (4).

11. The optical disk according to claim 1, wherein moiety (c-2) includes portions represented by formula (5).

12. The optical disk according to claim 1, wherein moiety (c-3) is a (meth)acryloyl group, an allyl group, a vinyl group, a vinyl ether group, a halogen group, or a mercapto group.

13. The optical disk according to claim 12, wherein moiety (c-3) is a (meth)acryloyl group.

14. The optical disk according to claim 1, wherein coefficient of dynamic friction of the surface of the hard coat layer is at most 0.07.

* * * * *